(12) United States Patent
Takahashi et al.

(10) Patent No.: US 10,031,515 B2
(45) Date of Patent: Jul. 24, 2018

(54) PRODUCTION SYSTEM INCLUDING ROBOT WITH POSITION CORRECTION FUNCTION THAT SUPPLIES OR EJECTS WORKPIECES TO OR FROM A MACHINE TOOL

(71) Applicant: FANUC CORPORATION, Yamanashi (JP)

(72) Inventors: Hiromitsu Takahashi, Yamanashi (JP); Hiroji Nishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 261 days.

(21) Appl. No.: 15/140,483

(22) Filed: Apr. 28, 2016

(65) Prior Publication Data

US 2016/0349741 A1    Dec. 1, 2016

(30) Foreign Application Priority Data

May 29, 2015  (JP) .................................. 2015-110129

(51) Int. Cl.
*G05B 19/418*  (2006.01)
*B23Q 7/04*  (2006.01)

(52) U.S. Cl.
CPC .  *G05B 19/41825* (2013.01); *G05B 19/41865* (2013.01); *B23Q 7/04* (2013.01); *G05B 2219/40113* (2013.01); *G05B 2219/50362* (2013.01); *Y02P 90/087* (2015.11); *Y02P 90/20* (2015.11)

(58) Field of Classification Search
None
See application file for complete search history.

(56) References Cited

U.S. PATENT DOCUMENTS

| | | | |
|---|---|---|---|
| 5,181,823 A | 1/1993 | Hussey et al. | |
| 5,400,638 A | 3/1995 | Kim | |
| 6,236,896 B1 * | 5/2001 | Watanabe | B25J 9/1692 414/730 |
| 2005/0273199 A1 * | 12/2005 | Ban | B25J 9/1682 700/248 |

(Continued)

FOREIGN PATENT DOCUMENTS

| | | |
|---|---|---|
| CN | 102300680 A | 12/2011 |
| JP | 61-111892 A | 5/1986 |

(Continued)

*Primary Examiner* — Mohammad Ali
*Assistant Examiner* — Bernard G Lindsay
(74) *Attorney, Agent, or Firm* — Hauptman Ham, LLP

(57) ABSTRACT

A production system in which a position of a robot relative to a machine tool can be measured and an operation position of the robot can be corrected based on the measurement result, by using a simple configuration. The robot has a vision device attached to a movable part such as a robot arm. The machine tool has a visual target arranged on an outer surface of the machine tool. An image of the visual target captured by a camera is processed by a robot controller or an image processor. Due to such image processing, the position of the robot relative to the machine tool can be measured. Further, the production system has a correcting part which corrects a position of a motion of the robot regarding supplying and ejecting a workpiece, based on the positional relationship between the robot and the machine tool.

4 Claims, 3 Drawing Sheets

(56) References Cited

U.S. PATENT DOCUMENTS

| | | | | |
|---|---|---|---|---|
| 2008/0188983 A1* | 8/2008 | Ban | ............... | B25J 9/1692 700/245 |
| 2011/0282492 A1* | 11/2011 | Krause | ............... | B25J 9/1664 700/259 |
| 2012/0277898 A1* | 11/2012 | Kawai | ............... | B25J 5/02 700/114 |
| 2013/0190915 A1* | 7/2013 | Choo | ............... | G05B 19/4189 700/113 |

FOREIGN PATENT DOCUMENTS

| | | |
|---|---|---|
| JP | 62-191904 A | 8/1987 |
| JP | 63-62003 A | 3/1988 |
| JP | 6-154880 A | 6/1994 |
| JP | 8-168978 A | 7/1996 |
| JP | 9-251309 A | 9/1997 |
| JP | 2009-782 A | 1/2009 |
| JP | 2010-513040 A | 4/2010 |
| JP | 2012-6122 A | 1/2012 |
| JP | 2014-113649 A | 6/2014 |
| WO | 2008/074836 A1 | 6/2008 |

* cited by examiner

PRODUCTION SYSTEM INCLUDING ROBOT WITH POSITION CORRECTION FUNCTION THAT SUPPLIES OR EJECTS WORKPIECES TO OR FROM A MACHINE TOOL

RELATED APPLICATIONS

The present application claims priority to Japanese Patent Application Number 2015-110129 filed May 29, 2015, the disclosure of which is hereby incorporated by reference herein in its entirety.

BACKGROUND OF THE INVENTION

1. Field of the Invention

The preset invention relates to a production system including a machine tool and a robot configured to supply and eject a workpiece processed by the machine tool.

2. Description of the Related Art

In a system including a machine tool and a robot configured to supply and eject a workpiece processed by the machine tool, when a positional displacement of the robot relative to the machine tool occurs, the robot cannot carry out an operation thereof precisely. Therefore, it is desired that the positional displacement is measured and corrected appropriately.

As relevant prior art documents, JP 2009-000782 A discloses a robot control system including a robot having a robot arm and a robot hand with a chuck for gripping a workpiece, attached to a front end of the robot arm; an operation section carrying out teaching input for the robot; a camera section capable of capturing the workpiece; and a control section which corrects a given coordinate position taught to the operation section based on an image captured by the camera section and drives/controls the robot so as to move the corrected coordinate position.

Further, JP S62-191904 A discloses a position correcting method used when a robot mounted on an unmanned carrier is conveyed to an operation position and an operation is carried out for a workpiece located at the operation position based on a previously taught teaching point. In the method, a predetermined portion is marked at the operation position, the position of the mark is detected by using a detecting means of the robot, and the position of the teaching point is corrected based on the detected position of the mark and the taught position of the mark.

In a system including a machine tool and a robot, the machine tool and the robot may be fixed to a floor by using an anchor bolt, etc., so that the placement positions of the machine tool and the robot are not displaced during operation of the system. However, when the machine tool or the robot is shifted (for example, a layout of the factory should be changed, etc.), it is necessary to refix the machine tool or the robot with an anchor bolt, etc., which is very troublesome. Therefore, when the layout is often changed, it is preferable that the machine tool or the robot is simply installed by using an outrigger, etc., without being fixed to the floor by using an anchor bolt.

However, when an outrigger is used, the placement position of the machine tool or the root may be gradually displaced due to vibration of the machine tool during operation or the motion of the robot arm, etc., whereby the positional relationship between the machine tool and the robot may be changed. When an amount of change in the positional relationship exceeds a certain level, the workpiece cannot be attached (or supplied) to or detached (or ejected) from the machine tool by the robot. In such a case, a camera is attached to a front end of the robot so as to detect the position of the workpiece and the position of a jig to which the workpiece is attached. By virtue of this, even when the placement position of the machine tool or the robot is displaced, the operation position of the robot is corrected based on the detection result, so that the robot can supply and eject the workpiece.

However, in the prior art, it is necessary to supply or eject a workpiece after the position of the workpiece or the jig is measured by the camera, and thus it takes time to supply or eject the workpiece. Further, when the workpiece or the jig to be measured by the camera is positioned inside the machine tool, it is difficult to properly measure the position thereof since the camera is affected by cutting oil.

For example, in JP 2009-000782 A, by capturing the workpiece by the compact camera arranged on the front end of the robot arm, the taught coordinate position can be corrected based on the image obtained by the camera and the robot can be moved to the corrected coordinate position. However, since the robot is moved to grip the workpiece after the workpiece is captured by the camera, the robot cannot be moved during the camera captures the workpiece and/or during the obtained image data is processed, whereby a cycle time of the robot is extended. Further, when the workpiece is supplied to or ejected from the machine tool, it is necessary to move the robot arm into the machine tool and move the camera close to the workpiece to capture the workpiece, and thus the camera is likely to be affected by cutting oil.

On the other hand, in JP S62-191904 A, the robot mounted on the unmanned carrier is moved to the operation position so as to carry out operation for the workpiece located at the operation position. In this regard, the predetermined portion is marked at the operation position, the position of the mark is detected by using the detecting means of the robot, and the difference between the detected position of the mark and the teaching point is detected, whereby the teaching point of the robot can be corrected. However, in this technique, the mark is detected after the unmanned carrier is moved to the operation position, and the position of the teaching point of the robot is corrected after the relative position. Therefore, in JP S62-191904 A, the correction of the displaced position is not discussed or considered when the same operation is repeated at the same position.

SUMMARY OF THE INVENTION

Therefore, an object of the present invention is to provide a production system in which the position of the robot relative to the machine tool can be measured and the operation position of the robot can be corrected based on the measurement result, by using a simple configuration.

According to the present invention, a production system including a machine tool and a robot which supplies or ejects a workpiece to or from the machine tool is provided, the production system comprising: a visual target arranged on an outer surface of the machine tool; a vision device arranged on a movable part of the robot, the vision device being configured to measure a positional relationship between the robot and the machine tool by capturing the visual target; and a correcting part which corrects a position of a motion the robot when the robot supplies of ejects the workpiece to or from the machine tool, based on the positional relationship between the robot and the machine tool measured by the vision device.

In a preferred embodiment, the production system comprises a scheduling part which starts the measurement of the vision device at the same timing as beginning of processing in the machine tool or at a previously designated timing between the beginning of processing and termination of processing.

In a preferred embodiment, the visual target is constituted by a plurality of markers.

In a preferred embodiment, at least one of the machine tool and the robot is fixed to a floor by using an outrigger.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
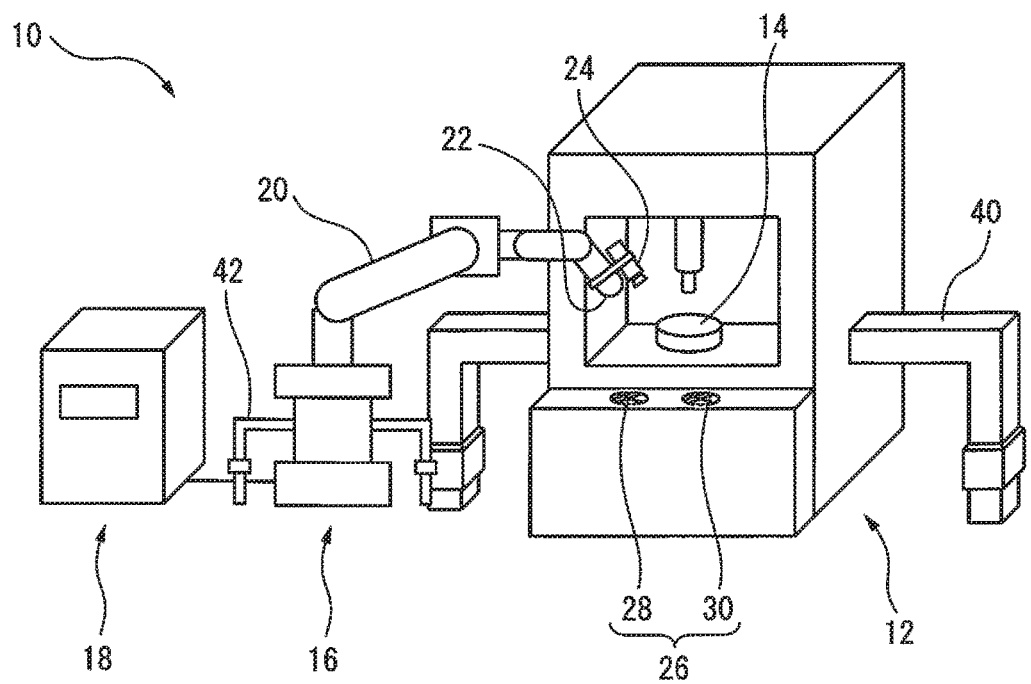
FIG. 1 is a schematic view showing an embodiment of a production system according to the present invention.

FIG. 1 is a schematic view showing a configuration of a production system (or processing system) according to an embodiment of the present invention. Production system 10 includes a machine tool 12 such as a numerical controlled machine tool, a robot 16 which supplies or ejects a workpiece 14 to or from machine tool 12, and a robot controller 18 which controls robot 16. In production system 10, various information (or signals) as explained below can be transmitted between robot controller 18 and a numerical controller, etc., which controls machine tool 12.

For example, robot 16 is a multi-joint robot having six axes, and has a robot arm 20, and a work tool 22 attached to a front end of robot arm 20. Robot 16 is configured to supply a workpiece 14 to be processed by machine tool 12, and eject a workpiece processed by machine tool 12.

Robot 16 has a vision device 24 such as a camera, attached to a movable part such as robot arm 20 or work tool 22. Machine tool 12 has a visual target 26 arranged on an outer surface (in the illustrated embodiment, a front surface) of machine tool 12. Visual target 26 may be constituted by a substantially one marker, or a plurality of markers 28 and 30 as shown.

An image of visual target 26 captured by camera 24 is processed by robot controller 18 or an image processor (not shown). Due to such image processing, the position of robot 16 relative to machine tool 12 (or the positional relationship between robot 16 and machine tool 12) can be measured. Further, production system 10 has a correcting part which corrects a position of a motion of robot 16 regarding supplying and ejecting workpiece 14, based on the positional relationship between robot 16 and machine tool 12 measured by camera 24. In the embodiment, robot controller 18 has the function of the correcting part and the function of a scheduling part as explained below.

Figure 2:
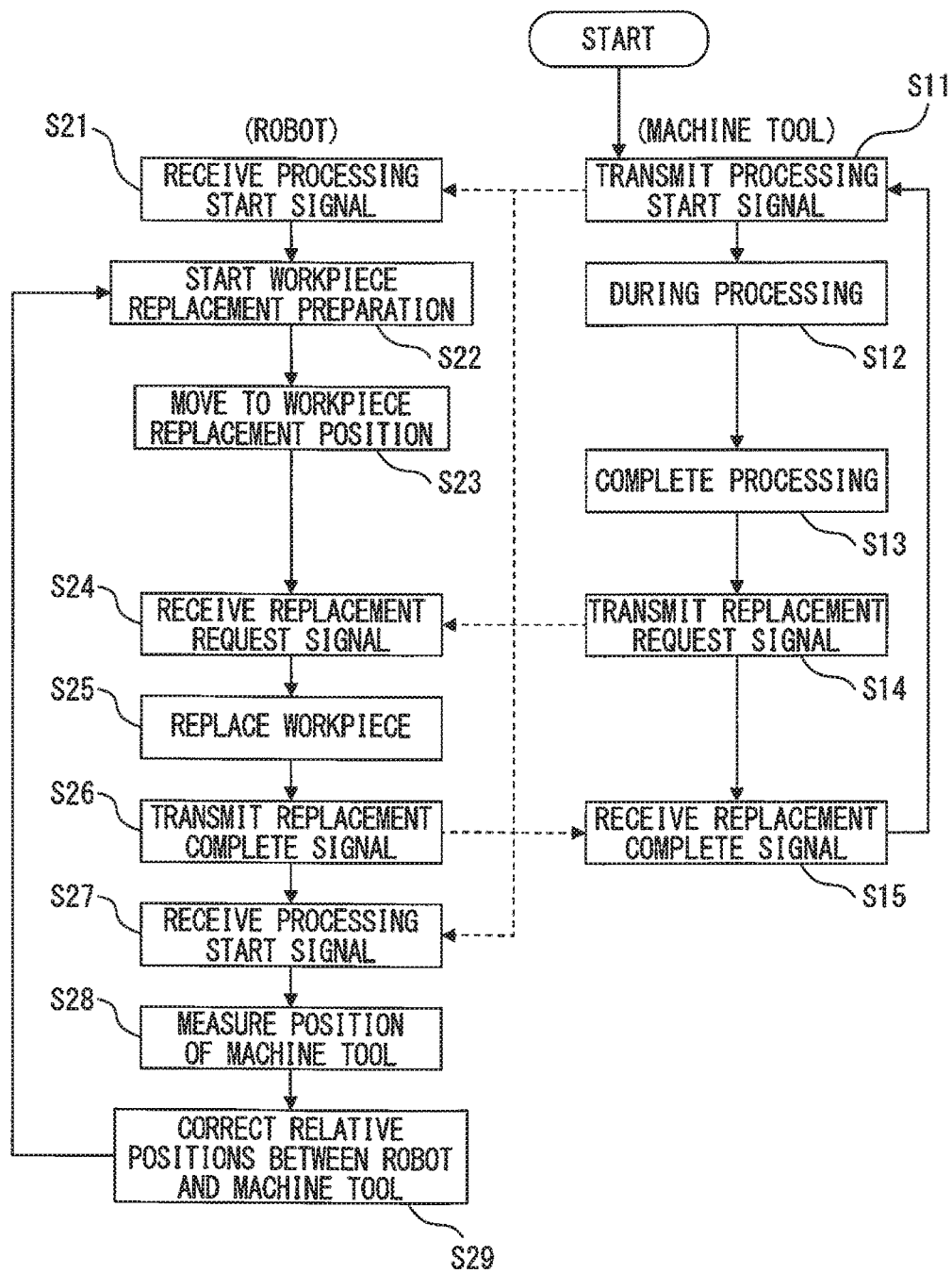
FIG. 2 is a flowchart showing an example of a procedure in the production system of FIG. 1.

Next, an example of a procedure in production system 10 will be explained with reference to a flowchart of FIG. 2. First, after the processing of a first workpiece is started in machine tool 12, information representing the start of processing (i.e., a processing start signal, etc.) is transmitted from machine tool 12 to robot 16 (or robot controller 18) (steps S11 and S21).

During the first workpiece is processed in machine tool 12 (step S12), a replacement preparation for the workpiece is started in robot 16 (step S22). Concretely, a second workpiece to be processed by machine tool 12 is gripped by hand 22, and the gripped second workpiece is moved to a predetermined workpiece replacement position (step S23).

After the processing of the first workpiece in machine tool 12 is completed (step S13), information representing that the workpiece should be replaced or exchanged (i.e., a replacement request signal, etc.) is transmitted from machine tool 12 to robot 16 (or robot controller 18) (steps S14 and S24). After receiving the replacement request signal, robot 16 enters the inside of machine tool 12 and replaces the first workpiece with the second workpiece (step S25).

After the workpiece replacement operation by robot 16 is completed, information representing the completion of processing (i.e., a replacement complete signal, etc.) is transmitted from robot 16 (or robot controller 18) to machine tool 12 (steps S26 and S15). After receiving the replacement complete signal, machine tool 12 starts the processing of the second workpiece, and transmits information representing the start of processing (i.e., a processing start signal, etc.) is transmitted from machine tool 12 to robot 16 (or robot controller 18) (steps S11).

After receiving the processing start signal regarding the second workpiece (step S27), robot 16 measures the position of machine tool 12 by using vision device 24 as explained above (step S28). Concretely, camera 24 is moved to a proper position so as to capture visual target 26 arranged on machine tool 12, and then, a positional relationship between robot 16 and machine tool 12 is calculated based on a result of image processing regarding the captured or obtained image and the position/orientation of camera 24. In this regard, the procedure of step S28 may be started at the same timing as beginning of processing in machine tool 12, or may be started during the processing (in other word, at a previously designated timing between the beginning of processing and termination of processing). Production system may have a scheduling part for setting the timing of measurement as described above, and the function of the scheduling part is provided to robot controller 18 in this embodiment.

Figure 3:
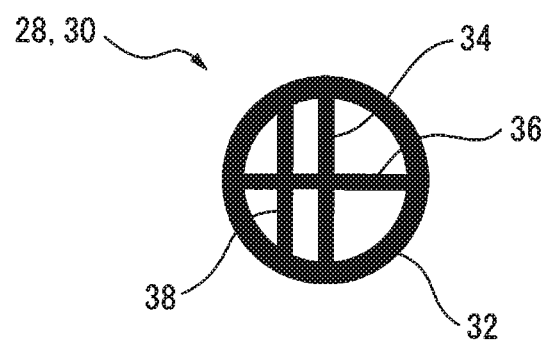
FIG. 3 is a view showing an example of a visual target arranged on a machine tool of the production system of FIG. 1.

FIG. 3 exemplifies an example of shapes of calibration markers 28 and 30, which constitute visual target 26 arranged on machine tool 12. In the example of FIG. 3, each of markers 28 and 30 has a circle 32, a cross line within circle 32, and a line segment 38. The cross line is constituted by two line segments 34 and 36 orthogonal to each other, and line segment 38 is parallel to one of line segments 34 and 36 (in the drawing, line segment 34). The shape of the calibration marker is not limited as such, and thus the calibration marker may have an arbitrary shape as long as the positional relationship between robot 16 and machine tool 12 can be specified based on the capture result of camera 24.

Visual target 26 is arranged on the outer surface of machine tool 12 (for example, a front, side or top surface of machine tool 12), not the inside of machine tool 12. In this regard, a positional relationship between the workpiece or a jig holding the workpiece positioned in machine tool 12 and visual target 26 is predetermined. Visual target 26 may be constituted by one marker, but the positional relationship between robot 16 and machine tool 12 can be precisely measured when visual target 26 is constituted by a plurality of markers.

After the procedure of step S28 is completed, a previously taught or programmed position of supplying/ejecting motion of robot 16 is corrected, based on the measured positional relationship (step S29). In other words, in the present invention, the supplying/ejecting motion of robot 16 is successively corrected based on the measured positional relationship, whereby the supplying/ejecting operation can be precisely carried out with respect to each workpiece. Therefore, it is not necessary to fix machine tool 12 to the floor by the anchor bolt, and thus machine tool 12 may be installed on the floor by a simple manner. For example, as shown in FIG. 1, machine tool 12 may be stationary on the floor by own weight, by using an outrigger 40 extending from machine tool 12 in the lateral (horizontal) direction. Similarly, it is not necessary to fix robot 16 to the floor by the anchor bolt, and thus robot 16 may be installed on the floor by a simple manner. For example, as shown in FIG. 1, robot 16 may be steady on the floor by own weight, by using an outrigger 42 extending from robot 16 in the lateral (horizontal) direction.

By executing the procedure of step S28 (i.e., the measurement of the positional relationship) at the beginning of processing or during processing in machine tool 12, the measurement of the positional relationship and the correction of the motion position can be completed before the replacement preparation for the next workpiece is started. Therefore, a cycle time of the robot is not lengthened due to the measurement of the positional relationship or the correction of the motion position, whereby an efficiency of the production system can be improved.

According to the present invention, at least one of the machine tool and the robot can be used without being strongly fixed to the floor, and thus the layout of the factory can be flexibly changed. Even when the position of the robot or the machine tool is corrected, a time required to supply or eject the workpiece to or from the machine tool is not substantially lengthened. Further, since the machine tool can be imaged or captured from the outside thereof, the position of the machine tool can be stably measured.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A production system including a machine tool and a robot which supplies or ejects a workpiece to or from the machine tool using a movable part of the robot that is movable relative to a body of the robot, the production system comprising:
   a visual target arranged on an outer surface of the machine tool;
   a vision device arranged on the movable part of the robot, the vision device being configured to measure a positional relationship between the robot and the machine tool by capturing the visual target; and
   a correcting part which corrects a position of a motion of the movable part of the robot when the robot supplies or ejects the workpiece to or from the machine tool, based on the positional relationship between the robot and the machine tool measured by the vision device,
   wherein the workpiece comprises a first workpiece or a second workpiece,
   wherein the measurement of the positional relationship by the vision device and the correction of the position of the motion of the movable part of the robot by the correcting part are performed after a replacement request signal representing that the first workpiece is to be replaced by the second workpiece or exchanged with the second workpiece in the machine tool is transmitted from the machine tool to the robot or a robot controller configured to control the robot, or after a replacement complete signal representing that a replacement of the first workpiece by the second workpiece is completed is transmitted from the robot or the robot controller to the machine tool, and
   wherein at least one of the machine tool and the robot is stationary or steady on a floor by its own weight without being fixed to the floor.

2. The production system as set forth in claim 1, wherein the production system comprises a scheduling part which starts the measurement of the vision device at the same timing as beginning of processing in the machine tool or at a previously designated timing between the beginning of processing and termination of processing.

3. The production system as set forth in claim 1, wherein the visual target is constituted by a plurality of markers.

4. The production system as set forth in claim 1, wherein at least one of the machine tool and the robot is fixed to the floor by an outrigger.

* * * * *